R. D. BEST.
EXPANDING HORSESHOE.
APPLICATION FILED SEPT. 8, 1914.
1,176,268.
Patented Mar. 21, 1916.
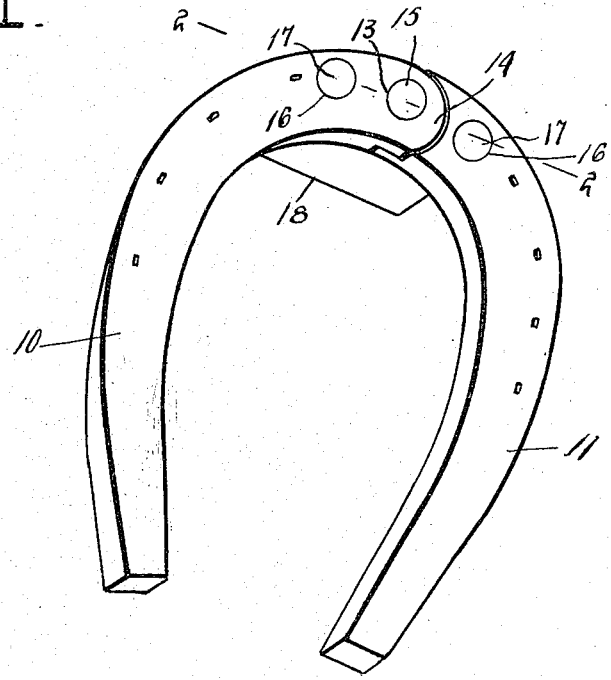
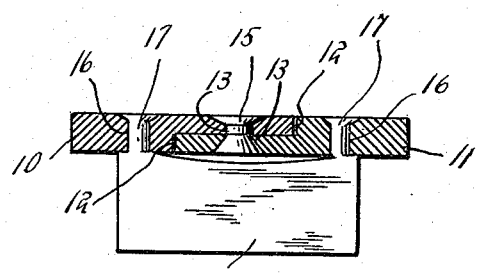

UNITED STATES PATENT OFFICE.

ROY D. BEST, OF DEER PARK, WASHINGTON, ASSIGNOR OF ONE-HALF TO WILLIAM H. SHORT, OF DEER PARK, WASHINGTON.

EXPANDING HORSESHOE.

1,176,268.  Specification of Letters Patent.  Patented Mar. 21, 1916.

Application filed September 8, 1914. Serial No. 860,639.

*To all whom it may concern:*

Be it known that I, ROY D. BEST, a citizen of the United States, residing at Deer Park, in the county of Spokane, State of Washington, have invented certain new and useful Improvements in Expanding Horseshoes; and I do hereby declare the following to be a full, clear, and exact description of the invention, such as will enable others skilled in the art to which it appertains to make and use the same.

This invention relates to improvements in horseshoes.

The principal object of the invention is to provide a horseshoe which will automatically expand as the horse's hoof grows.

Other objects and advantages will be apparent from the following description, when taken in connection with the accompanying drawings.

In the drawings: Figure 1 is a perspective view of the horseshoe. Fig. 2 is a transverse sectional view on the line 2—2 of Fig. 1.

Referring particularly to the accompanying drawing, 10 and 11 represent the sections of the horseshoe, each of which has a recessed end 12 provided with a vertical opening 13. The inner wall of the recess of each of the sections is formed on an arc with the opening 13 as the center and fitted into each recess is the end of the other section, the end face of which is rounded at 14 to fit snugly against the curved wall of the recess. A rivet 15 is passed through the openings 13 to hold the sections pivotally connected. The central rivet or pivot 15 is slightly less in diameter than the openings in the sections of the shoe so that there will be slight lost motion at this point while the sections swing positively on the lugs of the calk. In each of the inner end portions of the sections is formed a vertical opening 16, these openings receiving the lugs 17 of the toe calk 18 which is disposed transversely of the shoe and across the pivotal connection of the sections.

The calk holds the sections in proper spaced relation for the particular size of hoof to which the shoe is to be attached, but the sections may move under the influence of the expansion of the hoof as the horse's foot grows, by reason of the fact that the pivotal connection between the sections is slightly loose.

What is claimed is:

A horseshoe comprising a pair of sections having a slightly loose pivotal connection at their forward ends, each of the sections having an opening in the end portion adjacent the pivotal connection, and a toe calk having lugs secured in the said openings in such a manner that the sections will be permitted a limited pivotal movement away from each other on the lugs to adjust themselves to the horse's hoof as the foot grows.

In testimony whereof I affix my signature in the presence of two witnesses.

ROY D. BEST.

Witnesses:
 I. T. BOGGS,
 O. G. FOLLEVAAG.

Copies of this patent may be obtained for five cents each, by addressing the "Commissioner of Patents, Washington, D. C."